United States Patent
Seo et al.

(10) Patent No.: US 11,888,568 B2
(45) Date of Patent: Jan. 30, 2024

(54) APPARATUS AND METHOD FOR PROVIDING DIVERSITY SERVICE ANTENNA IN PORTABLE TERMINAL

(71) Applicant: Samsung Electronics Co., Ltd., Suwon-si (KR)

(72) Inventors: Jae-Min Seo, Suwon-si (KR); Eun-Joon Kim, Suwon-si (KR); Jae-Sun Park, Suwon-si (KR); Dae-Young Oh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 19 days.

(21) Appl. No.: 17/024,597

(22) Filed: Sep. 17, 2020

(65) Prior Publication Data

US 2021/0006319 A1 Jan. 7, 2021

Related U.S. Application Data

(60) Continuation of application No. 15/168,163, filed on May 30, 2016, now abandoned, which is a division of
(Continued)

(30) Foreign Application Priority Data

Dec. 2, 2011 (KR) .......................... 10-2011-0128152

(51) Int. Cl.
*H04B 7/0404* (2017.01)
*H04B 7/06* (2006.01)
(Continued)

(52) U.S. Cl.
CPC ......... *H04B 7/0689* (2013.01); *H04B 7/0404* (2013.01); *H04B 7/0604* (2013.01);
(Continued)

(58) Field of Classification Search
CPC .. H04B 7/0404; H04B 7/0602; H04B 7/0604; H04B 7/0689; H04B 7/0802;
(Continued)

(56) References Cited

U.S. PATENT DOCUMENTS 5,940,452 A 8/1999 Rich
6,002,672 A 12/1999 Todd
(Continued)

FOREIGN PATENT DOCUMENTS

CN 101267666 A 9/2008
CN 102177661 A 9/2011
(Continued)

OTHER PUBLICATIONS

Communication pursuant to Article 94(3) EPC dated Dec. 21, 2020 in connection with European Application No. 18192282.4, 9 pages.
(Continued)

*Primary Examiner* — Harun Chowdhury

(57) ABSTRACT

An apparatus and method configure a diversity antenna in a portable terminal. The apparatus includes a first antenna, a second antenna, a first communication unit for processing a first communication scheme signal communicated through the first antenna, a second communication unit for processing a second communication scheme signal communicated through the second antenna, and a control unit for configuring the first antenna as a diversity antenna for the second communication unit when the first communication unit is not driven.

12 Claims, 10 Drawing Sheets

Related U.S. Application Data application No. 13/684,121, filed on Nov. 21, 2012, now Pat. No. 9,356,663.

(51) Int. Cl.
  *H04B 7/08* (2006.01)
  *H04L 5/14* (2006.01)

(52) U.S. Cl.
  CPC ......... *H04B 7/0822* (2013.01); *H04B 7/0825* (2013.01); *H04B 7/0871* (2013.01); *H04L 5/14* (2013.01)

(58) Field of Classification Search
  CPC ... H04B 7/0825; H04B 7/0871; H04W 24/08; H04L 5/0062
  USPC ........ 370/252, 280, 334; 455/73, 277.1, 515
  See application file for complete search history.

(56) References Cited

U.S. PATENT DOCUMENTS

| | | | |
|---|---|---|---|
| 6,167,286 | A | 12/2000 | Ward et al. |
| 6,442,143 | B1 | 8/2002 | Corry |
| 7,353,012 | B2 | 4/2008 | Miyano et al. |
| 8,598,152 | B2 | 12/2013 | Plata Salaman et al. |
| 2003/0176176 | A1* | 9/2003 | Leinonen ............ H04B 7/12 455/277.1 |
| 2006/0017633 | A1 | 1/2006 | Pronkine |
| 2007/0026827 | A1 | 2/2007 | Miyano et al. |
| 2007/0268727 | A1 | 11/2007 | Kim et al. |
| 2008/0058000 | A1 | 3/2008 | Tanaka et al. |
| 2008/0227485 | A1 | 9/2008 | Kim |
| 2009/0141620 | A1 | 6/2009 | Hwang et al. |
| 2009/0156227 | A1 | 6/2009 | Frerking et al. |
| 2010/0046457 | A1 | 2/2010 | Abraham et al. |
| 2010/0113010 | A1 | 5/2010 | Tenny et al. |
| 2011/0136458 | A1 | 6/2011 | Seo |
| 2011/0176532 | A1* | 7/2011 | Franceschini ........ H04L 5/0062 370/310 |
| 2011/0212730 | A1 | 9/2011 | Wennstrom et al. |
| 2012/0077519 | A1 | 3/2012 | Suh |
| 2012/0202561 | A1 | 8/2012 | Robinett |
| 2012/0214501 | A1 | 8/2012 | Johansson et al. |
| 2012/0257689 | A1 | 10/2012 | Hong et al. |
| 2012/0264473 | A1* | 10/2012 | Mujtaba ............ H04B 7/0602 455/515 |
| 2012/0281553 | A1 | 11/2012 | Mujtaba et al. |
| 2012/0329513 | A1 | 12/2012 | Jung et al. |
| 2014/0350110 | A1 | 11/2014 | Buschmann et al. |

FOREIGN PATENT DOCUMENTS

| | | |
|---|---|---|
| CN | 1081856 C | 3/2020 |
| EP | 0883208 A2 | 12/1998 |
| EP | 1681772 A1 | 7/2006 |
| EP | 2028771 A1 | 2/2009 |
| GB | 2307831 A | 6/1997 |
| JP | H11-154895 A | 6/1999 |
| JP | 2005-295516 A | 10/2005 |
| KR | 10-2004-0079448 A | 9/2004 |
| KR | 10-2004-0097282 A | 11/2004 |
| KR | 10-2005-0081226 A | 8/2005 |
| KR | 10-2008-0083753 A | 9/2008 |
| KR | 10-2009-0110271 A | 10/2009 |
| KR | 10-2010-0085401 A | 7/2010 |
| KR | 10-2010-0125773 A | 12/2010 |
| KR | 10-2010-0128832 A | 12/2010 |
| KR | 10-2011-0041273 A | 4/2011 |
| KR | 10-2011-0041274 A | 4/2011 |
| KR | 10-2011-0067594 A | 6/2011 |
| KR | 10-2011-0068088 A | 6/2011 |
| KR | 10-2011-0069860 A | 6/2011 |
| KR | 10-2011-0071368 A | 6/2011 |
| KR | 10-2011-0073330 A | 6/2011 |
| KR | 10-2011-0076259 A | 7/2011 |
| KR | 10-2011-0091595 A | 8/2011 |
| WO | 2010/137904 A2 | 12/2010 |
| WO | 2011/074808 A2 | 6/2011 |

OTHER PUBLICATIONS

Notice of Preliminary Rejection regarding Korean Patent Application No. 10-2011-0128152, dated Mar. 6, 2018, 14 pages.

Notice of Patent regarding Korean Patent Application No. 10-2011-0128152, dated May 21, 2018, 4 pages.

Communication from a foreign patent office in a counterpart foreign application, European Patent Office, European Search Report for EP 18192282.4, dated Oct. 31, 2018, 6 pages.

Extended European Search Report dated Jul. 5, 2013 in connection with European Patent Application No. 12194844.2, 8 pages.

Notice of Preliminary Rejection dated Nov. 8, 2013 in connection with Japanese Patent Application No. 2012-262565, 5 pages.

Office Action issued for CN 2012105053472 dated Mar. 8, 2016, 10 pgs.

Japanese Decision of Rejection [with translation] in connection with Japanese Patent Application No. 2012-262565; Samsung Electronics; 7 pages.

Text of the First Office Action dated Dec. 31, 2014 in connection with Chinese Patent Application No. 2012-105053472; 11 pages.

Notice of Patent Grant dated Jan. 27, 2015 in connection with Japanese Patent Application No. 2012-262565; 5 pages.

Communication pursuant to Article 94(3) EPC in connection with European Application No. 18192282.4 dated Apr. 14, 2020, 7 pages.

Office Action dated Jun. 17, 2020 in connection with U.S. Appl. No. 15/168,163, 7 pages.

Office Action dated Nov. 20, 2019 in connection with U.S. Appl. No. 15/168,163, 12 pages.

Office Action dated Aug. 7, 2019 in connection with U.S. Appl. No. 15/168,163, 16 pages.

Office Action dated Mar. 22, 2019 in connection with U.S. Appl. No. 15/168,163, 15 pages.

Office Action dated Nov. 2, 2018 in connection with U.S. Appl. No. 15/168,163, 11 pages.

Office Action dated May 17, 2018 in connection with U.S. Appl. No. 15/168,163, 17 pages.

Office Action dated Aug. 14, 2015 in connection with U.S. Appl. No. 13/684,121, 15 pages.

\* cited by examiner

APPARATUS AND METHOD FOR PROVIDING DIVERSITY SERVICE ANTENNA IN PORTABLE TERMINAL

CROSS-REFERENCE TO RELATED APPLICATIONS

This application is a continuation of U.S. patent application Ser. No. 15/168,163 filed on May 30, 2016, which is a divisional of U.S. patent application Ser. No. 13/684,121, filed Nov. 21, 2012, now U.S. Pat. No. 9,356,663 issued on May 31, 2016 which claims priority under 35 U.S.C. § 119(a) to Korean Patent Application No. 10-2011-0128152 filed on Dec. 2, 2011 in the Korean Intellectual Property Office, the disclosures of which are herein incorporated by reference in their entirety.

BACKGROUND

1. Field

The present disclosure relates generally to an apparatus and method for providing a diversity service in a portable terminal, and in particular, to an apparatus and method for providing a diversity service by configuring a diversity antenna in a portable terminal.

2. Description of Related Art

A portable terminal may transmit and receive signals by using radio resources. In this case, transmission/reception (TX/RX) rates of the portable terminal may be degraded due to a fading caused by peripheral environments.

A portable terminal may use a diversity antenna device in order to prevent the degradation of transmission/reception rates by a fading.

When using a diversity antenna, a portable terminal may prevent the degradation of transmission/reception sensitivities by transmitting/receiving signals through a plurality of antennas.

In order to provide a diversity service, a portable terminal may include a plurality of antennas for a diversity service. In this case, the portable terminal is configured such that the antennas are separated from each other for spatial isolation therebetween. Accordingly, a portable terminal providing a diversity service has an increased space complexity due to a diversity antenna.

SUMMARY

To address the above-discussed deficiencies of the prior art, it is a primary object to provide an apparatus and method for configuring a diversity antenna in a portable terminal.

Another object of the present disclosure is to provide an apparatus and method for configuring a diversity antenna in a portable terminal without using an additional auxiliary antenna.

Another object of the present disclosure is to provide an apparatus and method for configuring a diversity antenna in a portable terminal supporting a dual mode, without using an additional auxiliary antenna.

Another object of the present disclosure is to provide an apparatus and method for configuring a diversity antenna in a portable terminal supporting TDD (Time Division Duplex) communication schemes, without using an additional auxiliary antenna.

Another object of the present disclosure is to provide an apparatus and method for configuring a diversity antenna in a portable terminal supporting a first communication scheme (e.g., a TDD communication scheme) and a second communication scheme (e.g., an FDD (Frequency Division Duplex) communication scheme), without using an additional auxiliary antenna.

Another object of the present disclosure is to provide an apparatus and method for configuring a first communication scheme antenna as a second communication scheme diversity antenna in a portable terminal supporting a first communication scheme (e.g., a TDD communication scheme) and a second communication scheme (e.g., an FDD communication scheme).

Another object of the present disclosure is to provide an apparatus and method for configuring a second communication scheme antenna as a first communication scheme diversity antenna in a portable terminal supporting a first communication scheme (e.g., a TDD communication scheme) and a second communication scheme (e.g., an FDD communication scheme).

Another object of the present disclosure is to provide an apparatus and method for configuring a GSM (Global System for Mobile communications) antenna as a CDMA (Code Division Multiple Access) diversity antenna in a portable terminal supporting a dual mode, by using a front-end module (FEM).

Another object of the present disclosure is to provide an apparatus and method for configuring a CDMA antenna as a GSM diversity antenna in a portable terminal supporting a dual mode, by using a switch disposed between an antenna and a CDMA communication module.

According to an aspect of the present disclosure, an apparatus for configuring a diversity antenna in a portable terminal includes: a first antenna; a second antenna; a first communication unit for processing a first communication scheme signal communicated through the first antenna; a second communication unit for processing a second communication scheme signal communicated through the second antenna; and a control unit for configuring the first antenna as a diversity antenna for the second communication unit when the first communication unit is not driven, wherein when the first antenna is configured as the diversity antenna, the second communication unit processes second communication scheme signals communicated through the first antenna and the second antenna.

According to another aspect of the present disclosure, a method for configuring a diversity antenna in a portable terminal including two or more communication units processing signals of different communication schemes includes: determining whether a first communication unit is driven; connecting a first antenna to a second communication unit when the first communication unit is not driven; and processing, by the second communication unit, second communication scheme signals communicated through the first antenna and a second antenna, wherein the first communication unit processes a first communication scheme signal communicated through the first antenna, and the second communication unit processes a second communication scheme signal communicated through the second antenna.

According to an aspect of the present disclosure, an apparatus for configuring a diversity antenna in a portable terminal includes: a first antenna; a second antenna; a first communication unit for processing a first communication scheme signal communicated through the first antenna; a second communication unit for processing a second communication scheme signal communicated through the second antenna; and a control unit for configuring the first antenna as a diversity antenna for the second communication unit in consideration of a communication environment of the second communication unit when the second communication unit is driven, wherein the second communication unit processes second communication scheme signals communicated through the first antenna and the second antenna, when the first antenna is configured as the diversity antenna, and the communication environment of the second communication unit includes at least one of a fading and an electric field strength of a signal communicated by the second communication scheme.

According to another aspect of the present disclosure, a method for configuring a diversity antenna in a portable terminal including two or more communication units processing signals of different communication schemes includes: determining a communication environment of a second communication unit when the second communication unit is driven; connecting a first antenna to the second communication unit in consideration of the communication environment of the second communication unit; and processing, by the second communication unit, second communication scheme signals communicated through the first antenna and a second antenna, wherein the first communication unit processes a first communication scheme signal communicated through the first antenna, the second communication unit processes a second communication scheme signal communicated through the second antenna, and the communication environment of the second communication unit includes at least one of a fading and an electric field strength of a signal communicated by the second communication scheme.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. Exemplary embodiments of the present disclosure will be described herein below with reference to the accompanying drawings. In the following description, detailed descriptions of well-known functions or configurations will be omitted since they would unnecessarily obscure the subject matters of the present disclosure. Also, the terms used herein are defined according to the functions of the present disclosure. Thus, the terms may vary depending on users' or operators' intentions or practices. Therefore, the terms used herein should be understood based on the descriptions made herein.

The present disclosure provides a scheme for configuring a diversity antenna in a portable terminal without using an additional auxiliary antenna.

In the following description, it is assumed that the portable terminal supports a dual mode of different communication schemes. For example, the portable terminal supports a TDD-based first communication scheme and second communication scheme. As another example, the portable terminal may support a TDD-based first communication scheme and an FDD-based second communication scheme.

However, even when the portable terminal supports three or more communication schemes, a diversity antenna be similarly configured without using an additional auxiliary antenna.

In the following description, examples of the portable terminal supporting a dual mode include a mobile terminal, a personal digital assistant (PDA), a laptop computer, a smart phone, a netbook, a mobile internet device (MID), an ultra-mobile personal computer (UMPC), a tablet PC, and the like.

In the following description, it is assumed that the portable terminal supports a dual mode of a GSM communication scheme and a CDMA communication scheme. For example, a GSM900 communication scheme uses an 880 to 960 MHz band and a CDMA communication scheme supports an 869 to 894 MHz band, the GSM communication scheme and the CDMA communication scheme may share an 880 to 894 MHz band. Accordingly, a CDMA module may use a GSM antenna as a CDMA diversity antenna, and a GSM module may use a CDMA antenna as a GSM diversity antenna.

The present disclosure relates to an apparatus and method for configuring a diversity antenna in a portable terminal without using an additional auxiliary antenna.

Figure 1:
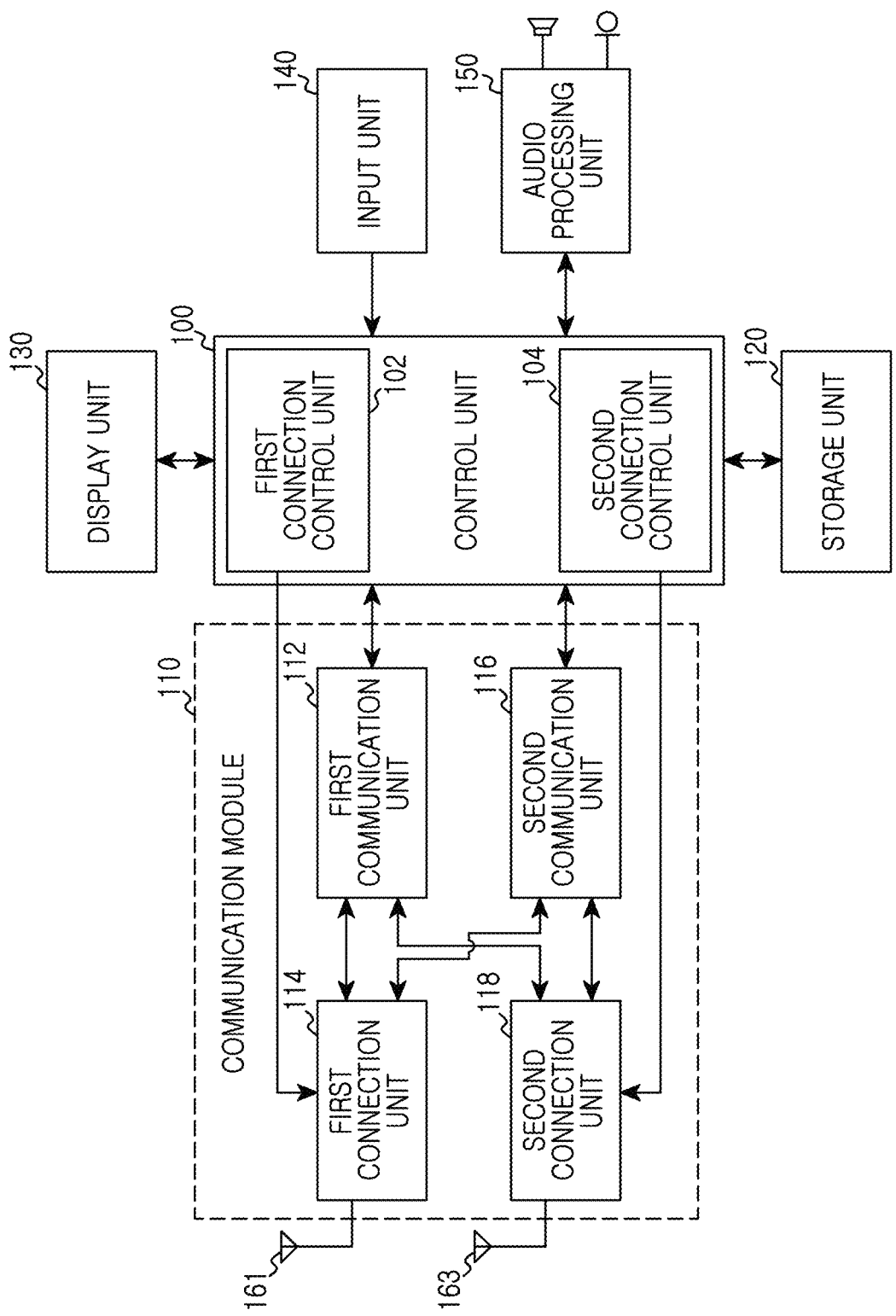
FIG. 1 illustrates a block diagram of a portable terminal according to the present disclosure.

FIG. 1 illustrates a block configuration of the portable terminal according to the present disclosure.

Referring to FIG. 1, the portable terminal includes a control unit 100, a communication module 110, a storage unit 120, a display unit 130, an input unit 140, and an audio processing unit 150.

The control unit 100 controls an overall operation of the portable terminal.

The control unit 100 controls a first connection control unit 102 and a second connection control unit 104 to configure a diversity antenna of a first communication unit 112 and a second communication unit 116. Herein, the first communication unit 112 is a communication module for a CDMA service, and the second communication unit 116 is a communication module for a GSM service.

When the first communication unit 112 is not driven, the first connection control unit 102 controls a first connection unit 114 such that a first antenna 161 operates as a diversity antenna of the second communication unit 116. For example, when a CDMA service is not provided and thus the first communication unit 112 operates an idle mode, the first connection control unit 102 controls the first connection unit 114 such that the first antenna 161 operates as a diversity antenna of the second communication unit 116. That is, when the first communication unit 112 operates an idle mode, the first connection control unit 102 controls the first connection unit 114 such that the first antenna 161 operates as a diversity antenna of a GSM communication scheme.

Figure 5:
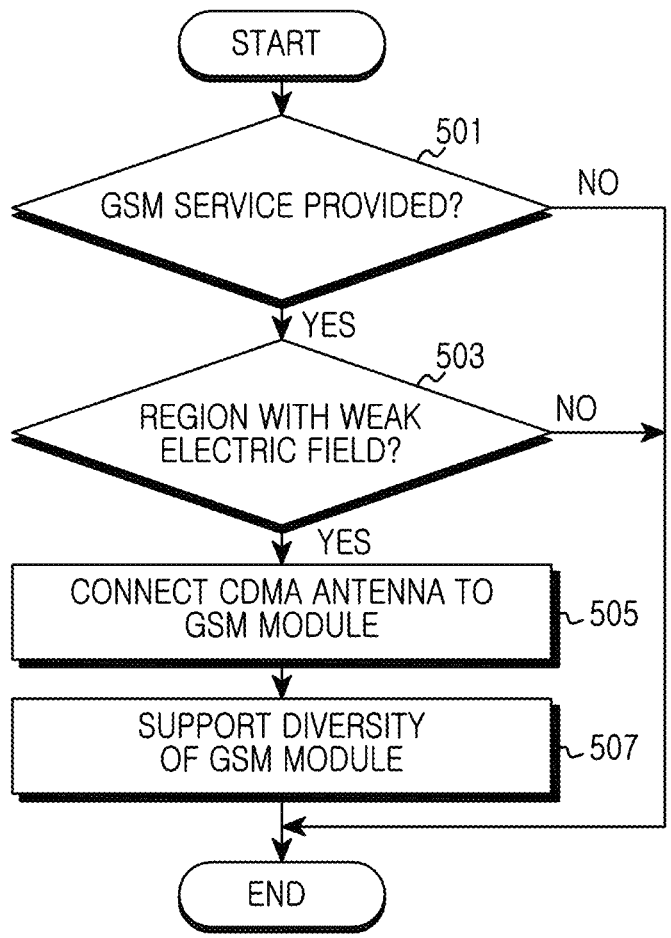
FIG. 5 illustrates a process for configuring a GSM diversity antenna in a portable terminal in consideration of an electric field strength according to an exemplary embodiment of the present disclosure.
Figure 6:
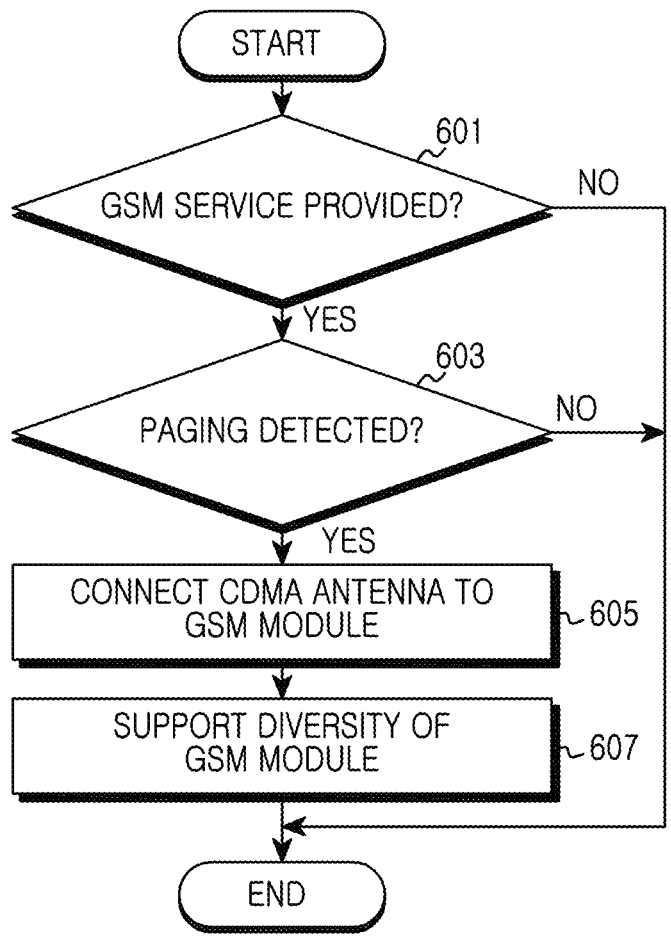
FIG. 6 illustrates a process for configuring a GSM diversity antenna in a portable terminal in consideration of a fading channel according to an exemplary embodiment of the present disclosure.
Figure 7:
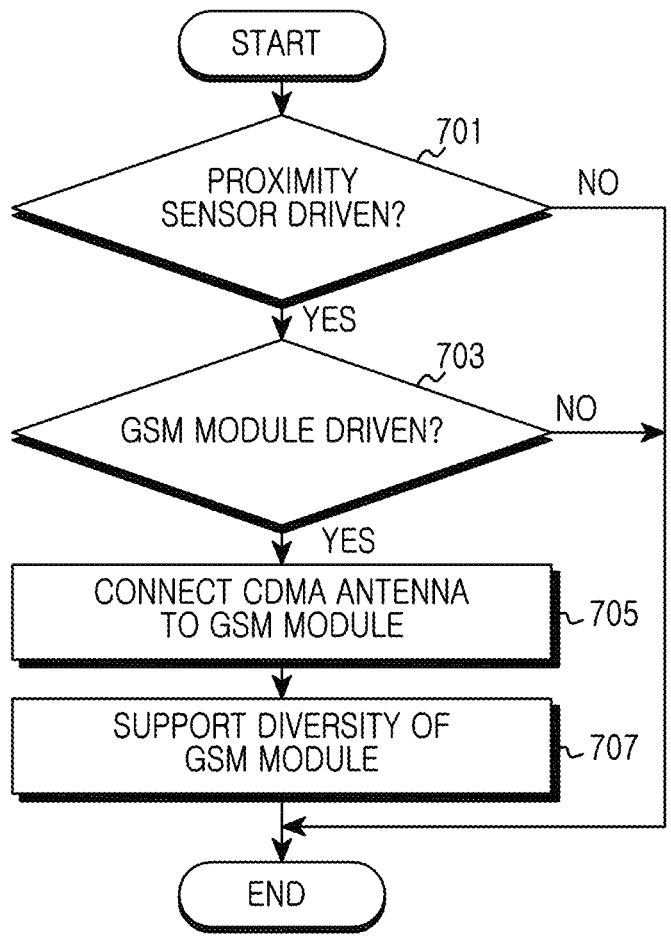
FIG. 7 illustrates a process for configuring a GSM diversity antenna in a portable terminal by using a CDMA antenna according to an exemplary embodiment of the present disclosure.

If the priority of a GSM service is higher than the priority of a CDMA service, the first connection control unit 102 may control the first connection unit 114 such that the first antenna 161 operates as a diversity antenna of the second communication unit 116, when the second communication unit 116 is driven, regardless of whether the first communication unit 112 is driven or not. For example, as illustrated in FIGS. 5 to 7, the first connection control unit 102 may control the first connection unit 114 such that the first antenna 161 operates as a diversity antenna of the second communication unit 116, when the second communication unit 116 is driven, regardless of whether the first communication unit 112 is driven or not.

When the second communication unit 116 is not driven, the second connection control unit 104 controls a second connection unit 118 such that a second antenna 163 operates as a diversity antenna of the first communication unit 112. For example, when a GSM service is not provided and thus the second communication unit 116 operates an idle mode, the second connection control unit 104 controls the second connection unit 118 such that the second antenna 163 operates as a diversity antenna of the first communication unit 112. That is, when the second communication unit 116 operates an idle mode, the second connection control unit 104 controls the second connection unit 118 such that the second antenna 163 operates as a diversity antenna of a CDMA communication scheme. As another example, when the second communication unit 116 operates in a transmission mode, the second connection control unit 104 controls the second connection unit 118 such that the second antenna 163 operates as a diversity antenna of the first communication unit 112 during a partial period when the second communication unit 116 does not operates in a transmission period thereof.

Figure 8:
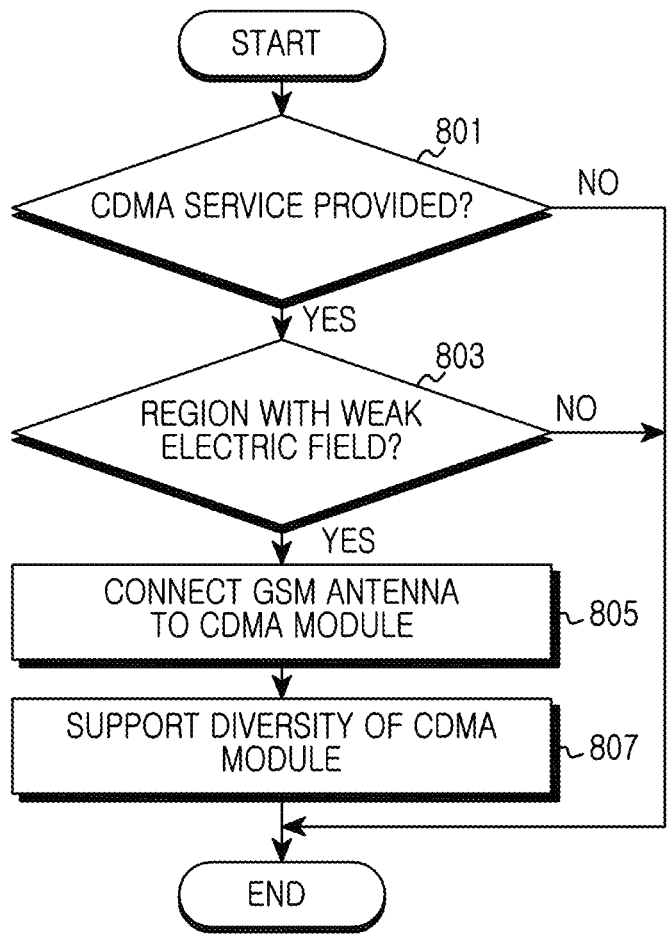
FIG. 8 illustrates a process for configuring a CDMA diversity antenna in a portable terminal in consideration of an electric field strength according to an exemplary embodiment of the present disclosure.
Figure 9:
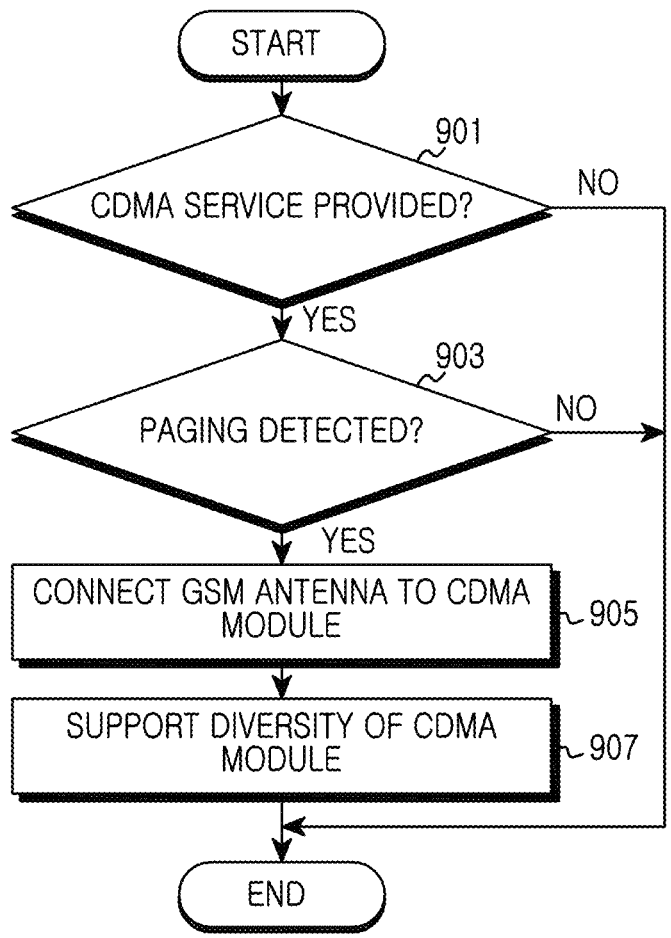
FIG. 9 illustrates a process for configuring a CDMA diversity antenna in a portable terminal in consideration of a fading channel according to an exemplary embodiment of the present disclosure.
Figure 10:
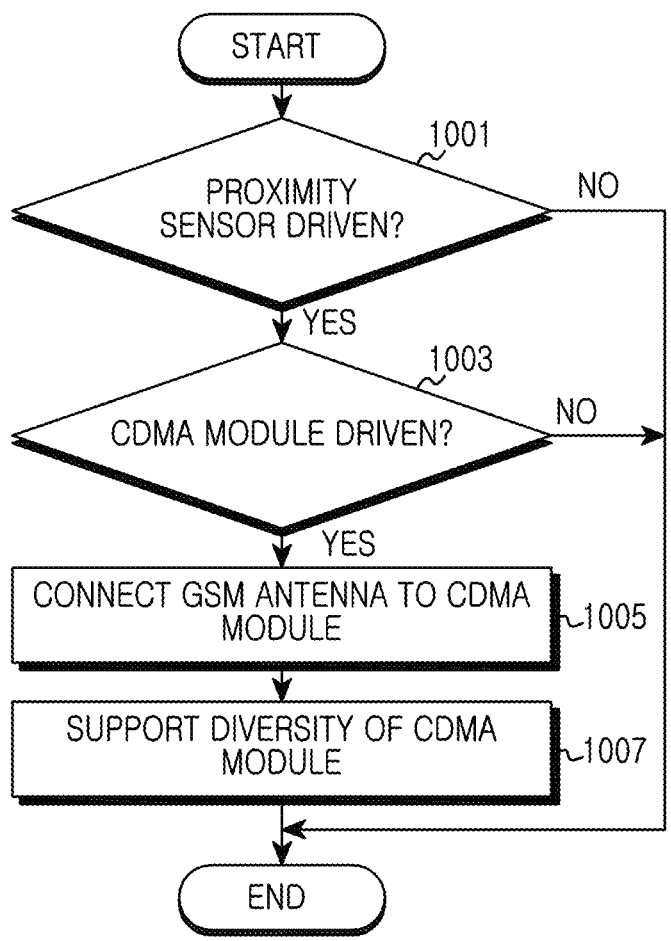
FIG. 10 illustrates a process for configuring a CDMA diversity antenna in a portable terminal by using a GSM antenna according to an exemplary embodiment of the present disclosure.

If the priority of a CDMA service is higher than the priority of a GSM service, the second connection control unit 104 may control the second connection unit 118 such that the second antenna 163 operates as a diversity antenna of the first communication unit 112, when the first communication unit 112 is driven, regardless of whether the second communication unit 116 is driven or not. For example, as illustrated in FIGS. 8 to 10, the second connection control unit 104 may control the second connection unit 118 such that the second antenna 163 operates as a diversity antenna of the first communication unit 112, when the first communication unit 112 is driven, regardless of whether the second communication unit 116 is driven or not.

The communication module 110 processes signals transmitted/received through antennas for voice and data communication. For example, the communication module 110 includes a first communication unit 112, a first connection unit 114, a second communication unit 116, and a second connection unit 118.

The first communication unit 112 processes signals communicated for a CDMA service. For example, the first communication unit 112 processes data signals and voice signals for a CDMA service that are communicated through the first antenna 161. As another example, when the second antenna 163 is connected to the first communication unit 112 through the second connection unit 118, the first communication unit 112 may process data signals and voice signals for a CDMA service that are communicated through the first antenna 161 and the second antenna 163. That is, the first communication unit 112 processes data signals and voice signals communicated for a CDMA service according to a diversity scheme using the first antenna 161 and the second antenna 163.

The first connection unit 114 connects the first antenna 161 to the first communication unit 112 or the second communication unit 116 under the control of the first connection control unit 102. For example, when the first communication unit 112 operates in an idle mode, the first connection unit 114 connects the first antenna 161 to the second communication unit 116 under the control of the first connection control unit 102. On the other hand, when the first communication unit 112 operates in an active mode, the first connection unit 114 connects the first antenna 161 to the first communication unit 112 under the control of the first connection control unit 102. Herein, the first connection unit 114 includes a switch for connecting the first antenna 161 to the first communication unit 112 or the second communication unit 116.

The second communication unit 116 processes signals communicated for a GSM service. For example, the second communication unit 116 processes data signals and voice signals for a GSM service that are communicated through the second antenna 163. As another example, when the first antenna 161 is connected to the second communication unit 116 through the first connection unit 118, the second communication unit 116 processes data signals and voice signals for a GSM service that are communicated through the first antenna 161 and the second antenna 163. That is, the second communication unit 116 processes data signals and voice signals communicated for a GSM service according to a diversity scheme using the first antenna 161 and the second antenna 163.

The second connection unit 118 connects the second antenna 163 to the first communication unit 112 or the second communication unit 116 under the control of the second connection control unit 104. For example, when the second communication unit 116 operates in an idle mode, the second connection unit 118 connects the second antenna 163 to the first communication unit 112 under the control of the second connection control unit 104. On the other hand, when the second communication unit 116 operates in an active mode, the second connection unit 118 connects the second antenna 163 to the second communication unit 116 under the control of the second connection control unit 104. As another example, when the second communication unit 116 operates in a transmission mode, the second connection unit 118 connects the second antenna 163 to the first communication unit 112 during a partial period when the second communication unit 116 does not operates in a transmission period thereof, under the control of the second connection control unit 104. On the other hand, when the second communication unit 116 operates in a transmission mode, the second connection unit 118 connects the second antenna 163 to the second communication unit 116 during a period when the second communication unit 116 operates in a transmission period thereof, under the control of the second connection control unit 104. Herein, the second connection unit 118 includes a front-end module (FEM).

When the second connection unit 118 includes an FEM, the FEM is configured to connect any one of reception paths connected to the second communication unit 116, to the first communication unit 112. Thereafter, the FEM connects the second antenna 163 to the first communication unit 112 or the second communication unit 116 under the control of the second connection control unit 104. For example, when a GSM service is not provided and thus the second communication unit 116 operates in an idle mode, the FEM connects the second antenna 163 to a reception path. In this example, the FEM connects the second antenna 163 to a reception path connected to the first communication unit 112, under the control of the second connection control unit 104.

The storage unit 120 may include a program storage unit for storing a program for controlling an operation of the portable terminal, and a data storage unit for storing data generated during the execution of a program.

Under the control of the control unit 100, the display unit 130 displays status information of the portable terminal, characters input by a user, moving pictures, still pictures, and the like. For example, the display unit 130 may include a touchscreen that has both an information display function and an input function.

The input unit 140 provides the control unit 100 with input data generated by user selection. For example, the input unit 140 may include only a control button. As another example, the input unit 140 may include a keypad for receiving input data from the user.

The audio processing unit 150 controls the input/output of audio signals. For example, the audio processing unit 150 outputs an audio signal received from the control unit 100 to the outside through a speaker, and provides an audio signal received from a microphone to the control unit 100.

Hereinafter, a description will be given of a method for providing a diversity service without using an additional auxiliary antenna.

Figure 2:
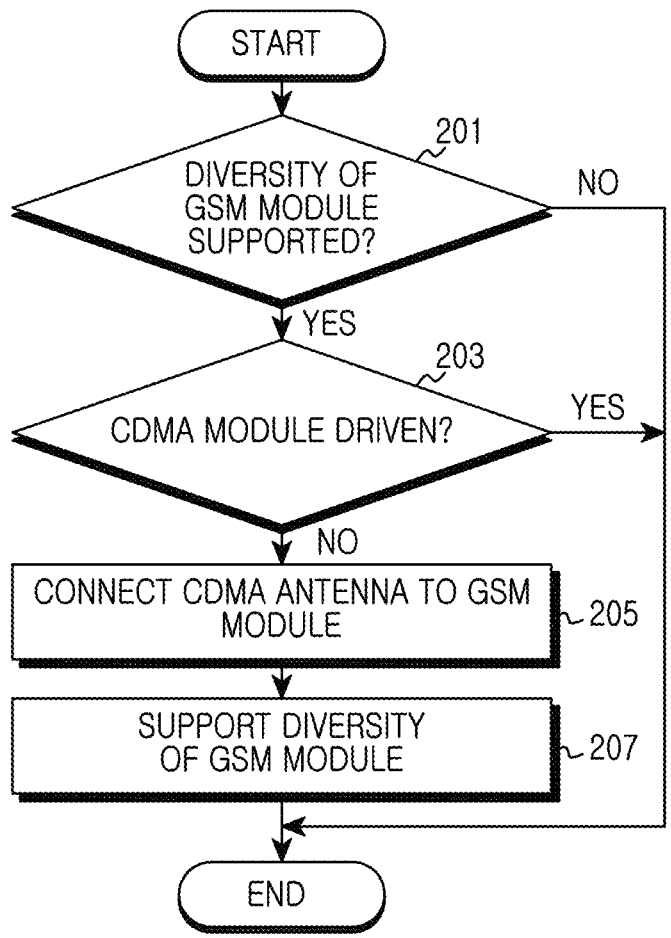
FIG. 2 illustrates a process for configuring a GSM diversity antenna in a portable terminal according to an exemplary embodiment of the present disclosure.

FIG. 2 illustrates a process for configuring a GSM diversity antenna in the portable terminal according to an exemplary embodiment of the present disclosure.

Referring to FIG. 2, in step 201, the portable terminal determines whether a diversity service of the GSM module is supported.

When a diversity service of the GSM module is not supported, the portable terminal ends the present algorithm.

On the other hand, when a diversity service of the GSM module is supported, the portable terminal proceeds to step 203. In step 203, the portable terminal determines whether the CDMA module is driven.

When the CDMA module is driven for a CDMA service, the portable terminal determines that a diversity service of the GSM module is not supported. Accordingly, the portable terminal ends the present algorithm.

On the other hand, when a CDMA service is not provided and thus the CDMA module is not driven, the portable terminal proceeds to step 205. In step 205, the portable terminal connects a CDMA antenna to the GSM module. For example, in FIG. 1, when the first communication unit 112 for a CDMA service operates in an idle mode, the first connection unit 114 connects the first antenna 161 to the second communication unit 116 under the control of the first connection control unit 102. That is, the portable terminal configures the first antenna 161 as a GSM diversity antenna. Herein, the idle mode of the first communication unit 112 is an operation state where the first communication unit 112 does not operate in a transmission mode and periodically or continuously checks whether a received signal is present.

Thereafter, in step 207, the portable terminal processes signals for a GSM service by a diversity scheme. For example, in FIG. 1, the second communication unit 116 processes GSM signals received through the first antenna 161 and the second antenna 163.

Thereafter, the portable terminal ends the present algorithm.

In the above exemplary embodiment, the portable terminal configures a CDMA antenna as a GSM diversity antenna.

Figure 3:
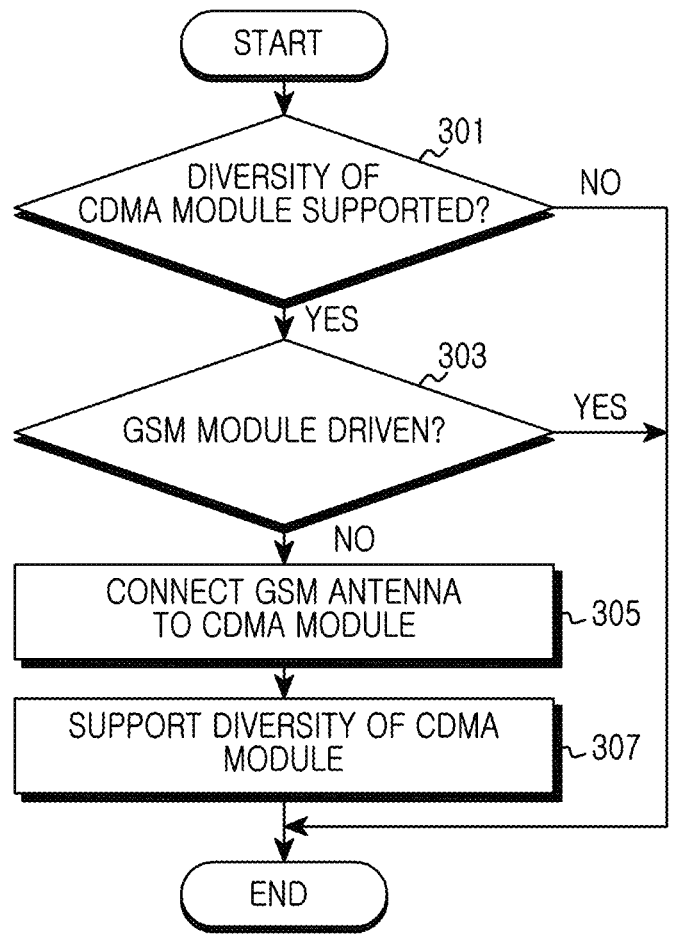
FIG. 3 illustrates a process for configuring a CDMA diversity antenna in a portable terminal according to an exemplary embodiment of the present disclosure.

In another exemplary embodiment, the portable terminal may configure a GSM antenna as a CDMA diversity antenna as illustrated in FIG. 3.

FIG. 3 illustrates a process for configuring a CDMA diversity antenna in the portable terminal according to an exemplary embodiment of the present disclosure.

Referring to FIG. 3, in step 301, the portable terminal determines whether a diversity service of the CDMA module is supported.

When a diversity service of the CDMA module is not supported, the portable terminal ends the present algorithm.

On the other hand, when a diversity service of the CDMA module is supported, the portable terminal proceeds to step 303. In step 303, the portable terminal determines whether the GSM module is driven.

When the GSM module is driven for a GSM service, the portable terminal determines that a diversity service of the CDMA module is not supported. Accordingly, the portable terminal ends the present algorithm.

On the other hand, when a GSM service is not provided and thus the GSM module is not driven, the portable terminal proceeds to step 305. In step 305, the portable terminal connects a GSM antenna to the CDMA module. For example, in FIG. 1, when the second communication unit 116 for a GSM service operates in an idle mode, the second connection unit 118 connects the second antenna 163 to the first communication unit 112 under the control of the second connection control unit 104. That is, the portable terminal configures the second antenna 163 as a CDMA diversity antenna. Herein, the idle mode of the second communication unit 116 is an operation state where the second communication unit 116 does not operate in a transmission mode and periodically or continuously checks whether a received signal is present.

Thereafter, in step 307, the portable terminal processes signals for a CDMA service by a diversity scheme. For example, in FIG. 1, the first communication unit 112 processes CDMA signals received through the first antenna 161 and the second antenna 163.

Thereafter, the portable terminal ends the present algorithm.

As described above, when the GSM module is not driven, the portable terminal configures the GSM antenna as a CDMA diversity antenna.

The GSM module operates in a TDMA (Time Division Multiple Access) scheme. For example, the GSM module uses only ⅛ slot of a transmission period according to a TDMA scheme, and does not use the remaining period. Accordingly, as illustrated in FIG. 4, the portable terminal may configure the GSM antenna as a CDMA diversity antenna during a partial period when the GSM module is not used in a transmission period of the GSM module.

Figure 4:
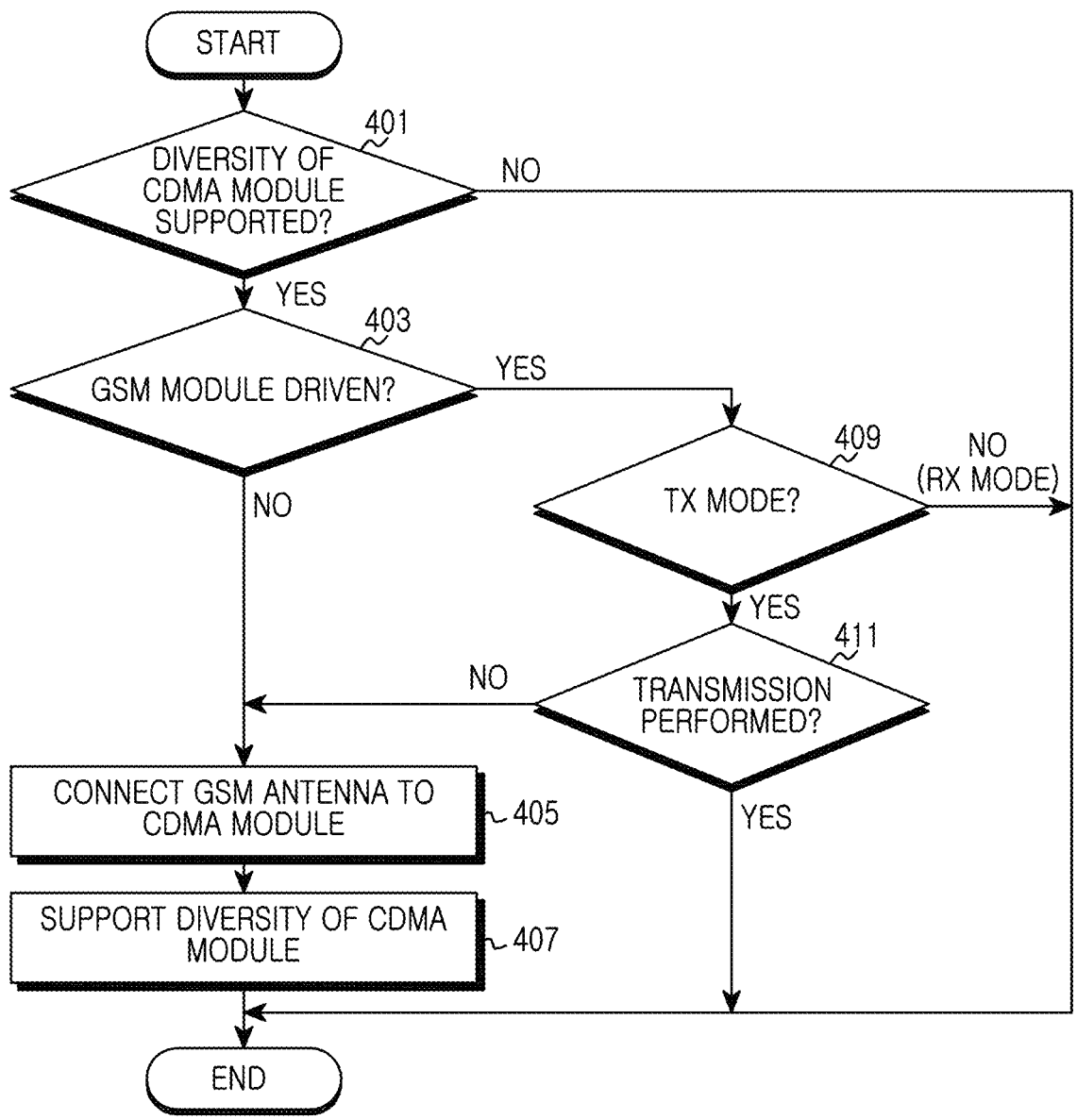
FIG. 4 illustrates a process for configuring a CDMA diversity antenna in a portable terminal according to another exemplary embodiment of the present disclosure.

FIG. 4 illustrates a process for configuring a CDMA diversity antenna in the portable terminal according to another exemplary embodiment of the present disclosure.

Referring to FIG. 4, in step 401, the portable terminal determines whether a diversity service of the CDMA module is supported.

When a diversity service of the CDMA module is not supported, the portable terminal ends the present algorithm.

On the other hand, when a diversity service of the CDMA module is supported, the portable terminal proceeds to step 403. In step 403, the portable terminal determines whether the GSM module is driven.

On the other hand, when a GSM service is not provided and thus the GSM module is not driven, the portable terminal proceeds to step 405. In step 405, the portable terminal connects a GSM antenna to the CDMA module. For example, in FIG. 1, when the second communication unit 116 for a GSM service operates in an idle mode, the second connection unit 118 connects the second antenna 163 to the first communication unit 112 under the control of the second connection control unit 104. That is, the portable terminal configures the second antenna 163 as a CDMA diversity antenna.

On the other hand, when the GSM module for a GSM service is driven, the portable terminal proceeds to step 409. In step 409, the portable terminal determines whether the GSM module operates in a transmission mode.

When the GSM module operates in an RX mode and receives signals for a GSM service, the portable terminal determines that a diversity service of the CDMA module is not supported. Accordingly, the portable terminal ends the present algorithm.

On the other hand, when the GSM module operates in a transmission mode, the portable terminal proceeds to step 411. In step 411, the portable terminal determines whether the GSM module transmits a signal. For example, the GSM module transmits signals by using only 1/8 slot of a transmission period according to a TDMA scheme. Accordingly, the portable terminal determines whether a current time point is included in a ⅛ slot of a transmission period when the GSM module can transmit a signal.

When the GSM module transmits a signal, that is, when a current time point is included in a ⅛ slot of a transmission period when the GSM module can transmit a signal, the portable terminal determines that a diversity service of the CDMA module is not supported. Accordingly, the portable terminal ends the present algorithm.

On the other hand, when the GSM module does not transmit a signal, the portable terminal determines that a current time point is included in a ⅞ slot of a transmission period when the GSM module does not transmit a signal. Accordingly, in step 405, the portable terminal connects the GSM antenna to the CDMA module. For example, in FIG. 1, when the second communication unit 116 for a GSM service operates in an idle mode, the second connection unit 118 connects the second antenna 163 to the first communication unit 112 under the control of the second connection control unit 104. That is, the portable terminal configures the second antenna 163 as a CDMA diversity antenna.

Thereafter, in step 407, the portable terminal processes signals for a CDMA service by a diversity scheme. For example, in FIG. 1, the first communication unit 112 processes CDMA signals received through the first antenna 161 and the second antenna 163.

Thereafter, the portable terminal ends the present algorithm.

In the above exemplary embodiment, it is assumed that the portable terminal receives signals for a GSM service when the GSM module operates in a reception mode. If the GSM module operates in a reception mode but there is a time period when signals for a GSM service are not received, the portable terminal may connect the GSM antenna to the CDMA module in a time period when signals for a GSM service are not received. In addition, when the GSM module operates in a reception mode but signals for a GSM service are not received, the portable terminal may connect the GSM antenna to the CDMA module.

As described above, the portable terminal may configure the GSM antenna as a CDMA diversity antenna even when the GSM module is driven. Accordingly, when the GSM module is driven during the use of the GSM antenna as a CDMA diversity antenna, the portable terminal may use the GSM antenna as a CDMA diversity antenna by using a period when the GSM module does not transmit a signal, as illustrated in FIG. 4.

As illustrated in FIG. 2, when the CDMA communication module does not use the CDMA antenna, the portable terminal configures the CDMA antenna as a GSM diversity antenna to support a diversity service of the GSM module.

In another exemplary embodiment, as illustrated in FIGS. 5 to 7, the portable terminal may configure the CDMA antenna as a GSM diversity antenna regardless of whether the CDMA module is driven or not.

In the following description, it is assumed that the portable terminal configures the CDMA antenna as a GSM diversity antenna in consideration of communication environment information of the GSM module. For example, as illustrated in FIG. 5, the portable terminal configures a GSM diversity antenna in consideration of an electric field strength of the GSM module.

FIG. 5 illustrates a process for configuring a GSM diversity antenna in the portable terminal in consideration of an electric field strength according to an exemplary embodiment of the present disclosure.

Referring to FIG. 5, in step 501, the portable terminal determines whether a GSM service is provided through the GSM.

When a GSM service is not provided through the GSM module, the portable terminal determines that the GSM module is not driven. Accordingly, the portable terminal ends the present algorithm.

On the other hand, when a GSM service is provided through the GSM module, the portable terminal proceeds to step 503. In step 503, the portable terminal determines whether a region for providing a GSM service is a weak electric field region. For example, the portable terminal may measure an electric field strength for a GSM service to determine whether a region for providing a GSM service is a weak electric field region.

When a region for providing a GSM service is not a weak electric field region, the portable terminal determines that a diversity service of the GSM module is not supported. Accordingly, the portable terminal ends the present algorithm.

On the other hand, when a region for providing a GSM service is a weak electric field region, the portable terminal determines that a diversity service of the GSM module is supported in order to improve a GSM service quality. Accordingly, in step 505, the portable terminal connects the CDMA antenna to the GSM module. For example, when the priority of a GSM service is higher than the priority of a CDMA service, the portable terminal connects the CDMA antenna to the GSM module regardless of whether the CDMA module is driven.

Thereafter, in step 507, the portable terminal processes signals for a GSM service by a diversity scheme. For example, in FIG. 1, the second communication unit 116 processes GSM signals received through the first antenna 161 and the second antenna 163.

Thereafter, the portable terminal ends the present algorithm.

In the above exemplary embodiment, the portable terminal configures a GSM diversity antenna in consideration of an electric field strength of the GSM module.

In another exemplary embodiment, as illustrated in FIG. 6, the portable terminal may configure a GSM diversity antenna in consideration of fading characteristics of the GSM module.

FIG. 6 illustrates a process for configuring a GSM diversity antenna in the portable terminal in consideration of a fading channel according to an exemplary embodiment of the present disclosure.

Referring to FIG. 6, in step 601, the portable terminal determines whether a GSM service is provided through the GSM.

When a GSM service is not provided through the GSM module, the portable terminal determines that the GSM module is not driven. Accordingly, the portable terminal ends the present algorithm.

On the other hand, when a GSM service is provided through the GSM module, the portable terminal proceeds to step 603. In step 603, the portable terminal determines whether a fading of a GSM service is detected. That is, the portable terminal determines whether a reception wave sensitivity of the GSM service changes rapidly.

When a fading of a GSM service is not detected, the portable terminal determines that a diversity service of the GSM module is not supported. Accordingly, the portable terminal ends the present algorithm.

On the other hand, when a fading of a GSM service is detected, the portable terminal determines that a diversity service of the GSM module is supported in order to improve a GSM service quality. Accordingly, in step 605, the portable terminal connects the CDMA antenna to the GSM module. For example, when the priority of a GSM service is higher than the priority of a CDMA service, the portable terminal connects the CDMA antenna to the GSM module regardless of whether the CDMA module is driven.

Thereafter, in step 607, the portable terminal processes signals for a GSM service by a diversity scheme. For example, in FIG. 1, the second communication unit 116 processes GSM signals received through the first antenna 161 and the second antenna 163.

Thereafter, the portable terminal ends the present algorithm.

In the above exemplary embodiment, when a fading of a GSM service is detected, the portable terminal configures the CDMA antenna as a GSM diversity antenna.

In another exemplary embodiment, when a fading of a GSM service is out of a predetermined range, the portable terminal may configure the CDMA antenna as a GSM diversity antenna.

In the above exemplary embodiment, the portable terminal selectively configures a GSM diversity antenna in consideration of communication environment information of the GSM module.

In another exemplary embodiment, as illustrated in FIG. 7, the portable terminal may configure the CDMA antenna as a GSM diversity antenna according to whether the GSM module is driven or not.

FIG. 7 illustrates a process for configuring a GSM diversity antenna in the portable terminal by using a CDMA antenna according to an exemplary embodiment of the present disclosure.

Referring to FIG. 7, in step 701, the portable terminal determines whether a proximity sensor is driven. For example, the portable terminal uses a proximity sensor to determine when an external object approaches.

When the proximity sensor is not driven, the portable terminal determines that an external object does not approach. Accordingly, the portable terminal ends the present algorithm.

On the other hand, when the proximity sensor is driven, the portable terminal determines that an external object approaches for a call. Accordingly, in step 703, the portable terminal determines whether the GSM module is driven.

When the GSM module is not driven, the portable terminal ends the present algorithm.

On the other hand, when the GSM module is driven, the portable terminal proceeds to step 705. In step 705, the portable terminal connects the CDMA antenna to the GSM module. For example, when the priority of a GSM service is higher than the priority of a CDMA service, the portable terminal connects the CDMA antenna to the GSM module regardless of whether the CDMA module is driven.

Thereafter, in step 707, the portable terminal processes signals for a GSM service by a diversity scheme. For example, in FIG. 1, the second communication unit 116 processes GSM signals received through the first antenna 161 and the second antenna 163.

Thereafter, the portable terminal ends the present algorithm.

As illustrated in FIGS. 3 and 4, when the GSM communication module does not use the GSM antenna, the portable terminal configures the GSM antenna as a CDMA diversity antenna to support a diversity service of the CDMA module.

In another exemplary embodiment, as illustrated in FIGS. 8 to 10, the portable terminal may configure the GSM antenna as a CDMA diversity antenna regardless of whether the GSM module is driven or not.

In the following description, it is assumed that the portable terminal configures the GSM antenna as a CDMA diversity antenna in consideration of communication environment information of the CDMA module. For example, as illustrated in FIG. 8, the portable terminal configures a CDMA diversity antenna in consideration of an electric field strength of the CDMA module.

FIG. 8 illustrates a process for configuring a CDMA diversity antenna in the portable terminal in consideration of an electric field strength according to an exemplary embodiment of the present disclosure.

Referring to FIG. 8, in step 801, the portable terminal determines whether a CDMA service is provided through the CDMA.

When a CDMA service is not provided through the CDMA module, the portable terminal determines that the CDMA module is not driven. Accordingly, the portable terminal ends the present algorithm.

On the other hand, when a CDMA service is provided through the CDMA module, the portable terminal proceeds to step 803. In step 803, the portable terminal determines whether a region for providing a CDMA service is a weak electric field region. For example, the portable terminal measures an electric field strength for a CDMA service.

When a region for providing a CDMA service is not a weak electric field region, the portable terminal determines that a diversity service of the CDMA module is not supported. Accordingly, the portable terminal ends the present algorithm.

On the other hand, when a region for providing a CDMA service is a weak electric field region, the portable terminal determines that a diversity service of the CDMA module is supported in order to improve a CDMA service quality. Accordingly, in step 805, the portable terminal connects the GSM antenna to the CDMA module. For example, when the priority of a CDMA service is higher than the priority of a GSM service, the portable terminal connects the GSM antenna to the CDMA module regardless of whether the GSM module is driven or not.

Thereafter, in step 807, the portable terminal processes signals for a CDMA service by a diversity scheme. For example, in FIG. 1, the first communication unit 112 processes CDMA signals received through the first antenna 161 and the second antenna 163.

Thereafter, the portable terminal ends the present algorithm.

In the above exemplary embodiment, the portable terminal configures a CDMA diversity antenna in consideration of an electric field strength of the CDMA module.

In another exemplary embodiment, as illustrated in FIG. 9, the portable terminal may configure a CDMA diversity antenna in consideration of fading characteristics of the CDMA module.

FIG. 9 illustrates a process for configuring a CDMA diversity antenna in the portable terminal in consideration of a fading channel according to an exemplary embodiment of the present disclosure.

Referring to FIG. 9, in step 901, the portable terminal determines whether a CDMA service is provided through the CDMA.

When a CDMA service is not provided through the CDMA module, the portable terminal determines that the CDMA module is not driven. Accordingly, the portable terminal ends the present algorithm.

On the other hand, when a CDMA service is provided through the CDMA module, the portable terminal proceeds to step 903. In step 903, the portable terminal determines whether a fading of a CDMA service is detected. That is, the portable terminal determines whether a reception wave sensitivity of the CDMA service changes rapidly.

When a fading of a CDMA service is not detected, the portable terminal determines that a diversity service of the CDMA module is not supported. Accordingly, the portable terminal ends the present algorithm.

On the other hand, when a fading of a CDMA service is detected, the portable terminal determines that a diversity service of the CDMA module is supported in order to improve a CDMA service quality. Accordingly, in step 905, the portable terminal connects the GSM antenna to the CDMA module. For example, when the priority of a CDMA service is higher than the priority of a GSM service, the portable terminal connects the GSM antenna to the CDMA module regardless of whether the GSM module is driven or not.

Thereafter, in step 907, the portable terminal processes signals for a CDMA service by a diversity scheme. For example, in FIG. 1, the first communication unit 112 processes CDMA signals received through the first antenna 161 and the second antenna 163.

Thereafter, the portable terminal ends the present algorithm.

In the above exemplary embodiment, when a fading of a CDMA service is detected, the portable terminal configures the GSM antenna as a CDMA diversity antenna.

In another exemplary embodiment, when a fading of a CDMA service is out of a predetermined range, the portable terminal may configure the GSM antenna as a CDMA diversity antenna.

In the above exemplary embodiment, the portable terminal selectively configures a CDMA diversity antenna in consideration of communication environment information of the CDMA module.

In another exemplary embodiment, as illustrated in FIG. 10, he portable terminal may configure the GSM antenna as a CDMA diversity antenna according to whether the CDMA module is driven or not.

FIG. 10 illustrates a process for configuring a CDMA diversity antenna in the portable terminal by using a GSM antenna according to an exemplary embodiment of the present disclosure.

Referring to FIG. 10, in step 1001, the portable terminal determines whether a proximity sensor is driven. For example, the portable terminal uses a proximity sensor to determine when an external object approaches.

When the proximity sensor is not driven, the portable terminal determines that an external object does not approach. Accordingly, the portable terminal ends the present algorithm.

On the other hand, when the proximity sensor is driven, the portable terminal determines that an external object approaches for a call. Accordingly, in step 1003, the portable terminal determines whether the CDMA module is driven.

When the CDMA module is not driven, the portable terminal ends the present algorithm.

On the other hand, when the CDMA module is driven, the portable terminal proceeds to step 1005. In step 1005, the portable terminal connects the GSM antenna to the CDMA module. For example, when the priority of a CDMA service is higher than the priority of a GSM service, the portable terminal connects the GSM antenna to the CDMA module regardless of whether the GSM module is driven or not.

Thereafter, in step 1007, the portable terminal processes signals for a CDMA service by a diversity scheme. For example, in FIG. 1, the first communication unit 112 processes CDMA signals received through the first antenna 161 and the second antenna 163.

Thereafter, the portable terminal ends the present algorithm.

As described above, the present disclosure does not use an additional auxiliary antenna in the portable terminal supporting a dual mode, and uses the antenna of the first communication module as a diversity antenna of the second communication module. Accordingly, the present disclosure can provide a diversity service without using an additional auxiliary antenna, thus making it possible to prevent the space complexity from increasing due to an additional antenna.

While the invention has been shown and described with reference to certain exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. An electronic device comprising:
a first antenna;
a second antenna;
a first communication circuit configured to operate in a reception mode or a transmission mode and to process a radio frequency (RF) signal of a first frequency band supporting a first communication scheme;
a second communication circuit configured to operate in the transmission mode or an idle mode without operating in the transmission mode and to process an RF signal of a second frequency band supporting a second communication scheme, the first communication circuit and the second communication circuit being disposed separately;
a first connection circuit configured to electrically connect the first antenna to one of the first communication circuit or the second communication circuit;
a second connection circuit configured to electrically connect the second antenna to one of the first communication circuit or the second communication circuit, the first connection circuit and the second connection circuit being disposed separately; and
a processor configured to control an operation of the first connection circuit and the second connection circuit based on an operation state,
wherein the processor is configured to:
determine whether the first communication circuit operates in the transmission mode or the reception mode,
in case that the first communication circuit operates in the transmission mode:
determine whether the first communication circuit transmits a first signal of the first communication scheme,
in case that the first communication circuit operates in the transmission mode and the first communication circuit does not transmit the first signal, control the first connection circuit and the second connection circuit so that both the first antenna and the second antenna are electrically connected to the second communication circuit, and
in case that the first communication circuit operates in the reception mode, maintain a state in which the first communication circuit is connected to the first antenna and the second communication circuit is connected to the second antenna,
wherein, in case that the first communication circuit operates in the transmission mode and the first communication circuit does not transmit the first signal, the second communication circuit is configured to:
receive a first RF signal through the first connection circuit and the first antenna and a second RF signal through the second connection circuit and the second antenna,
process the first RF signal in an overlap frequency band and the second RF signal in the second frequency band, wherein the overlap frequency band is a frequency band at which the first frequency band overlaps the second frequency band, and
output the processed first RF signal and the processed second RF signal to the processor, and
wherein, in case that the first communication circuit operates in the reception mode, the second communication circuit does not receive a RF signal in the first frequency band through the first connection circuit and the first antenna.

2. The electronic device of claim 1, wherein the first communication scheme is a time division duplex (TDD) scheme, and the second communication scheme is a frequency division duplex (FDD) scheme.

3. The electronic device of claim 1, wherein the processor is configured to configure the first antenna as a diversity antenna for the second communication circuit during a period when the first communication circuit is not driven and the second communication circuit is driven.

4. The electronic device of claim 1, wherein when the first communication circuit operates in an idle mode, the processor is configured to control the first connection circuit and the second connection circuit to electrically connect the first antenna and the second antenna to the second communication circuit.

5. The electronic device of claim 4, wherein, when the first communication circuit operates in an active mode, the processor is configured to control the first connection circuit to electrically connect the first antenna to the first communication circuit and to control the second connection circuit to electrically connect the second antenna to the second communication circuit.

6. The electronic device of claim 1, wherein the first connection circuit is configured to electrically connect the first antenna to one of the first communication circuit or the second communication circuit in response to control of the processor; and
wherein the second connection circuit is configured to electrically connect the second antenna to one of the first communication circuit or the second communication circuit in response to control of the processor,
wherein, when the first communication circuit operates in an idle mode, the first connection circuit is configured to electrically connect the first antenna to the second communication circuit, and the second connection circuit is configured to electrically connect the second antenna to the second communication circuit, and
wherein when the first communication circuit operates in an active mode, the first connection circuit is configured to electrically connect the first antenna to the first communication circuit, and the second connection circuit is configured to electrically connect the second antenna to the second communication circuit.

7. The electronic device of claim 1, wherein the first connection circuit comprising:
a front-end module (FEM) configured to electrically connect the first antenna to one of the first communication circuit and the second communication circuit in response to control of the processor, wherein when the first communication circuit operates in an idle mode, the FEM is configured to electrically connect the first antenna to the second communication circuit, and
wherein when the first communication circuit operates in an active mode, the FEM is configured to electrically connect the first antenna to the first communication circuit.

8. A method for configuring a diversity antenna in an electronic device comprising a first antenna, a second antenna, a first communication circuit configured to operate in a reception mode or a transmission mode and to process a radio frequency (RF) signal of a first frequency band supporting a first communication scheme, a second communication circuit configured to operate in a transmission mode or an idle mode without operating in the transmission mode and to process a RF signal of a second frequency band supporting a second communication scheme, a first connection circuit configured to electrically connect the first antenna to one of the first communication circuit or the second communication circuit and a second connection circuit configured to electrically connect the second antenna to one of the first communication circuit or the second communication circuit, the method comprising:
determining whether the first communication circuit operates in the transmission mode or the reception mode;
in case that the first communication circuit operates in the transmission mode:
determining whether the first communication circuit transmits a first signal of the first communication scheme;
in case that the first communication circuit does not transmit the first signal;
controlling the first connection circuit and the second connection circuit so that both the first antenna and the second antenna are electrically connected to the second communication circuit;
receiving a first RF signal through the first connection circuit and the first antenna and a second RF signal through the second connection circuit and the second antenna; and
processing the first RF signal in an overlap frequency band and the second RF signal in the second frequency band, wherein the overlap frequency band is a frequency band at which the first frequency band overlaps the second frequency band, and
in case that the first communication circuit operates in the reception mode, maintaining a state in which the first communication circuit is connected to the first antenna and the second communication circuit is connected to the second antenna,
wherein the first communication circuit and the second communication circuit are disposed separately, and
wherein the first connection circuit and the second connection circuit are disposed separately.

9. The method of claim 8, wherein the first communication scheme is a time division duplex (TDD) scheme, and the second communication scheme is a frequency division duplex (FDD) scheme.

10. The method of claim 8, further comprising electrically connecting the first antenna to the second communication circuit so that the first antenna is configured as a diversity antenna for the second communication circuit.

11. The method of claim 8, further comprising when the first communication circuit operates in an idle mode, electrically connecting the first antenna and the second antenna to the second communication circuit using the first connection circuit and the second connection circuit.

12. The method of claim 11, further comprising, when the first communication circuit operates in an active mode, electrically connecting the first antenna to the first communication circuit and electrically connecting the second antenna to the second communication circuit using the first connection circuit and the second connection circuit.

\* \* \* \* \*